United States Patent [19]
Koehler

[11] Patent Number: 5,543,674
[45] Date of Patent: Aug. 6, 1996

[54] DYNAMOELECTRIC MACHINE COMPOSED OF SECTORS HAVING TRANSVERSE FLUXES

[75] Inventor: Gerard Koehler, Ville d'Avray, France

[73] Assignee: Radio Energie, Marcoussis Cedex, France

[21] Appl. No.: 962,182

[22] PCT Filed: Jun. 28, 1991

[86] PCT No.: PCT/FR91/00518

§ 371 Date: Jun. 29, 1993

§ 102(e) Date: Jun. 29, 1993

[87] PCT Pub. No.: WO92/00628

PCT Pub. Date: Jan. 9, 1992

[30] Foreign Application Priority Data

Jul. 2, 1990 [FR] France .................. 90 08340

[51] Int. Cl.[6] ................................. H02K 19/00
[52] U.S. Cl. .................. 310/164; 310/254; 310/261; 318/701
[58] Field of Search ................. 310/162–164, 310/106, 112, 114, 261, 254, 216, 181, 179, 195, 231; 318/701

[56] References Cited

U.S. PATENT DOCUMENTS

| | | | |
|---|---|---|---|
| 1,212,544 | 1/1917 | Neuland | 310/195 |
| 3,855,486 | 12/1974 | Binder et al. | 310/216 |
| 3,930,175 | 12/1975 | Chirgwin | 310/179 |
| 4,223,255 | 9/1980 | Goldman et al. | |
| 5,365,137 | 11/1994 | Richardson et al. | 310/112 |

FOREIGN PATENT DOCUMENTS

| | | |
|---|---|---|
| 2203212 | 5/1974 | France . |
| 2329097 | 5/1977 | France . |
| 2358046 | 2/1978 | France . |
| 2302323 | 8/1974 | Germany . |
| 2727450 | 1/1978 | Germany . |

*Primary Examiner*—R. Skudy
*Attorney, Agent, or Firm*—Young & Thompson

[57] ABSTRACT

A variable-reluctance rotating dynamoelectric machine is provided with, for each single-phase structure A, B, and C, two rows of airgaps 5–27, 6–28 having the same radius Re connected to each other by means of angular sectors, one of which surrounds stator conductors 8 in the shape of a torus. The sectors are arches 9, 22 each constituted by a stack of strips of sheet metal which are bent along axes X perpendicular to the axis of rotation Z. A pair of arches 9, 22 is formed by cutting a wound and bonded ring of thin magnetic sheet having oriented grains. Cutting by wire-type spark erosion results in the formation of several pairs of teeth per arch. A rotor winding in the shape of a torus or a rotor permanent magnet can complete the machine. The machine is applicable to reluctance motors for vehicle traction, which can also recharge a storage battery.

21 Claims, 3 Drawing Sheets

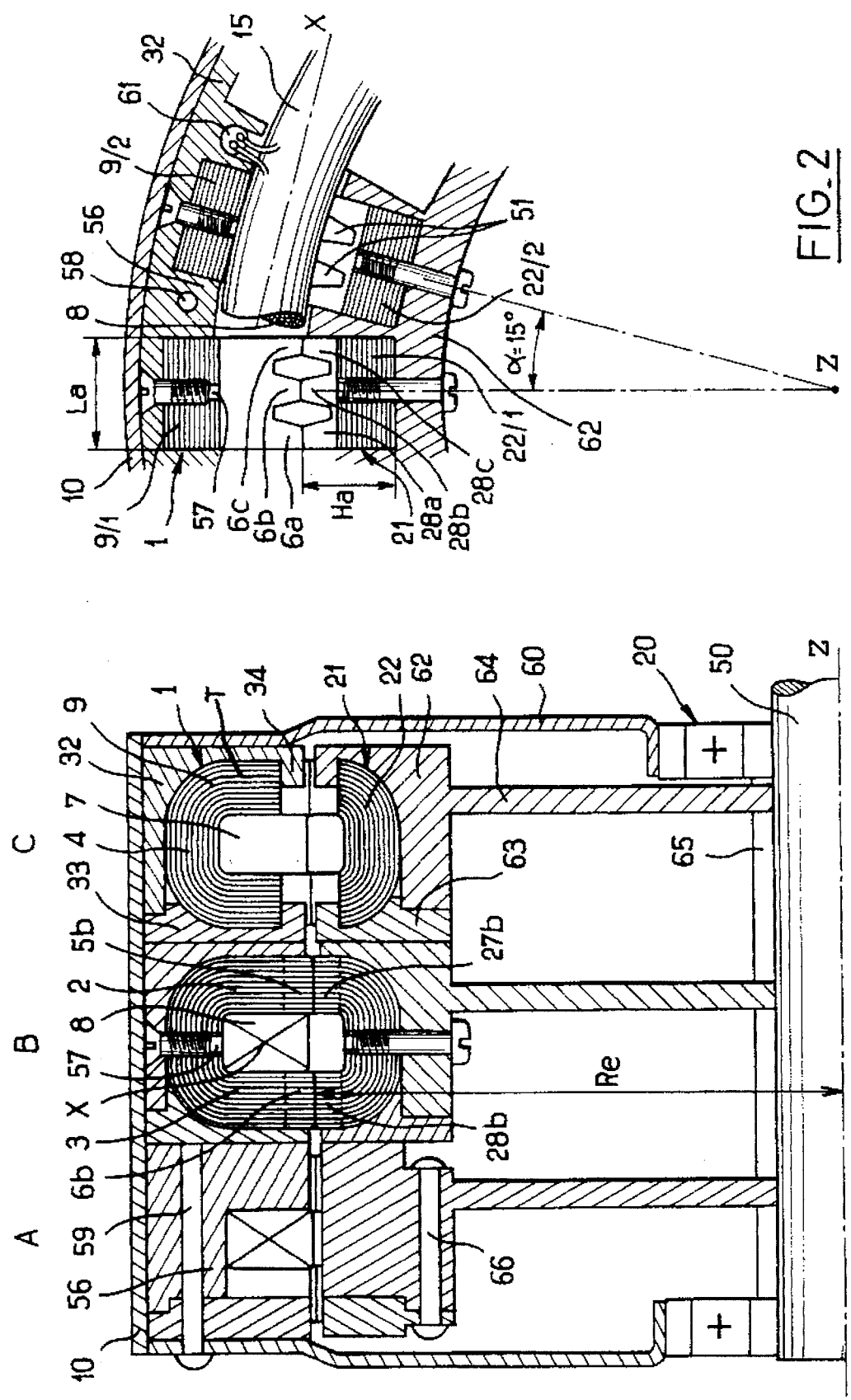

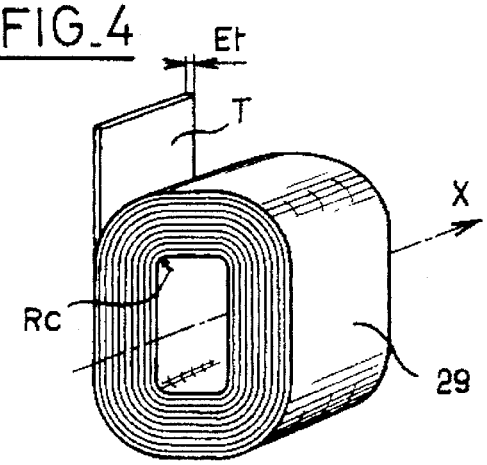
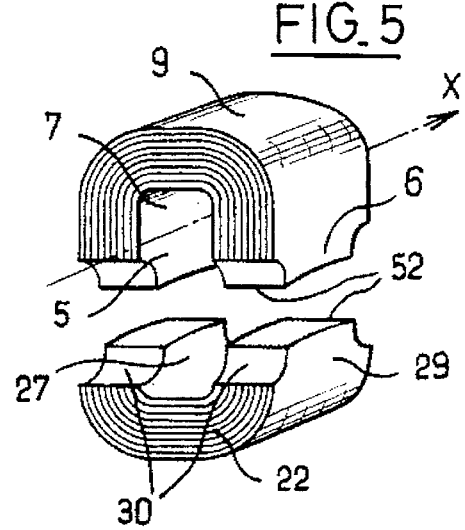
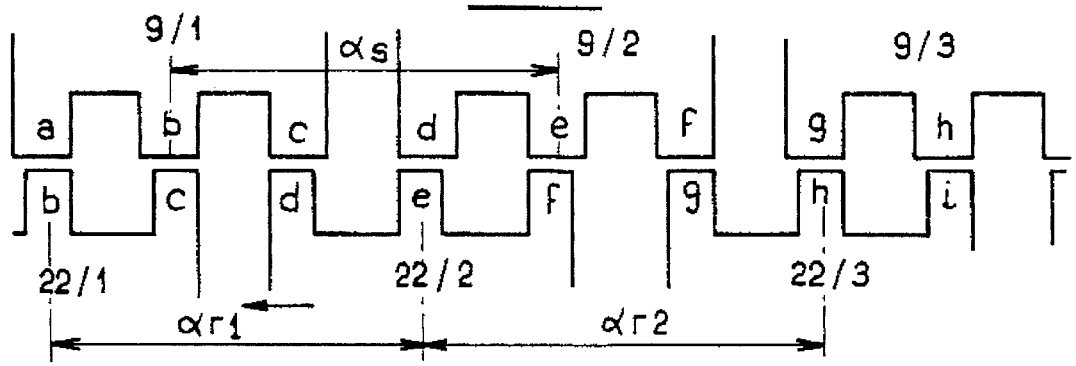
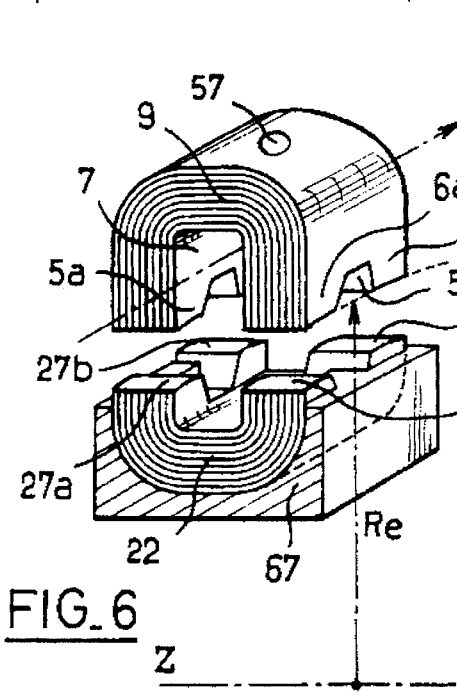
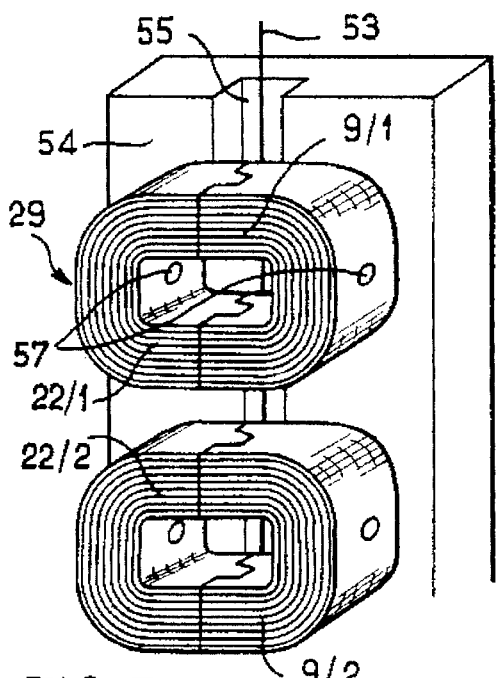

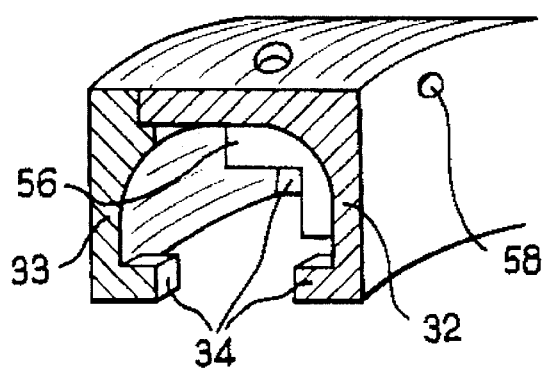
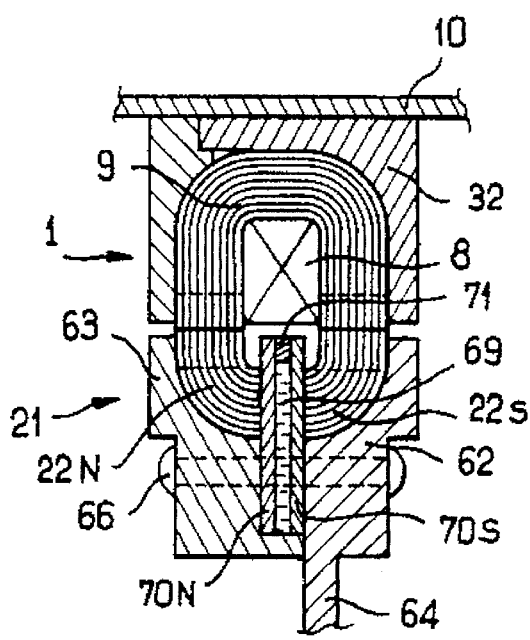
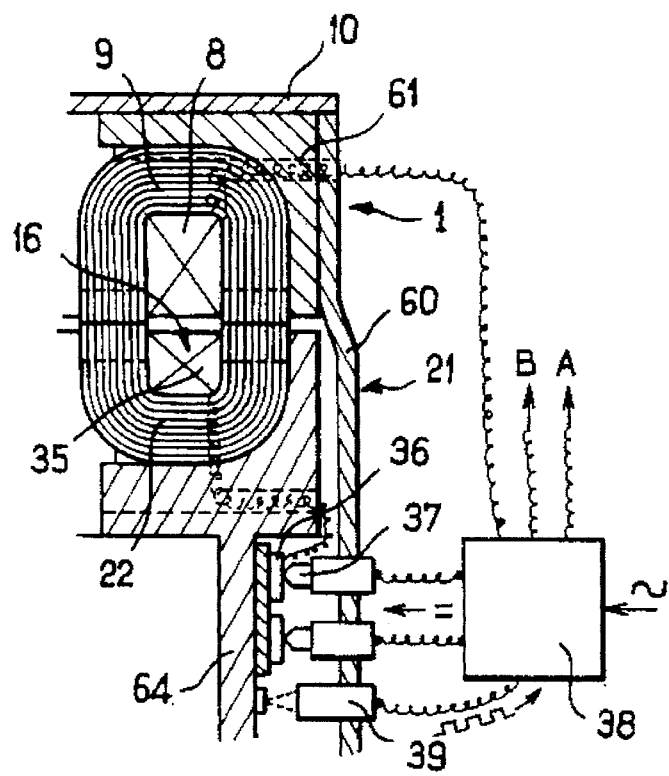
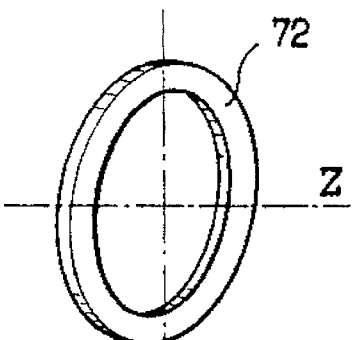
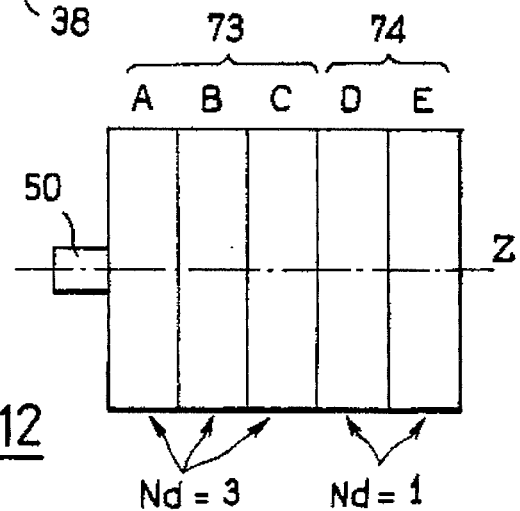

5,543,674

DYNAMOELECTRIC MACHINE COMPOSED OF SECTORS HAVING TRANSVERSE FLUXES

BACKGROUND OF THE INVENTION

The present invention relates to a rotating dynamoelectric machine such as a variable-reluctance motor, comprising a stator magnetic circuit provided with windings in and a rotor magnetic circuit.

The stator magnetic circuit can be either inside the rotor magnetic circuit as in FR-A-2329097 which describes a wheel-motor in which the electrical phases are distributed angularly about the axis of rotation Z, or outside as in FR-A-2203212 in which the single-phase structures are juxtaposed along the axis of rotation Z.

If the magnetic circuits are formed by stacks of thin metal sheets along the axis Z, cutting-out of these sheets calls in both cases for substantial tool equipment and results in losses of material. Furthermore, in the case of FR-A-2203212, the flux has to pass from one sheet to another through parasitic reluctances.

DE-A-2302323 also describes juxtaposed structures. The stator magnetic circuit and the rotor magnetic circuit are each formed by an assembly of eight independent angular sectors each constituted by metal sheets, the plane of which passes substantially through the axis of the motor. The stator sectors have a U shape and straddle a phase winding and the rotor sectors are rectangular. There is little loss of material, there is no longer any joint reluctance and the flux path is as short as possible.

However, in order to have sufficient core cross-sections, it is found necessary to have one stack of metal sheets per sector. It is also preferable to have an airgap area of small length in order to reduce its perimeter along which are formed fluxes having low-efficiency fringes. Closure by overlapping of an airgap is accordingly carried out sheet by sheet and abruptly in the case of each sheet instead of simultaneously in the case of all the sheets and progressively in the case of each sheet. This results in considerable core losses since the flux has to be established abruptly in the case of each sheet and has to pass from one sheet to the adjacent sheet in order to spread out.

DE-A-2727450 describes a synchronous or stepping motor composed of a plurality of single-phase structures juxtaposed coaxially with an axis of rotation. Each structure comprises in accordance with FIGS. 6 and 7:

a stator magnetic circuit constituted by an assembly of stator angular sectors arranged in a circle about the axis of rotation, each sector as seen in a direction tangential to the axis f rotation being given a U-shaped profile having two arms, the entire series of arms of the sectors being provided at the free ends of at least one set of arms with a row of stator teeth;

a stator winding coaxial with the axis of rotation and housed within U-shaped sectional members of the stator magnetic circuit;

a rotor magnetic circuit in which provision is made for two rows of rotor teeth each located opposite to one row of stator teeth so as to constitute two annular rows of airgaps.

If the permanent magnets 19 and 20 were suppressed, this would result in variable-reluctance operation.

In accordance with the above-mentioned patent document, the magnetic circuits are of soft magnetic material in either sintered or massive form with joints. In both cases, substantial core losses result. Furthermore, sintered parts involve high tooling costs and a limitation of the size of motors.

In order to be able to operate at high speeds and therefore at high switching frequencies, it is desirable to make use of metal sheets of small thickness having oriented grains. It is difficult, however, to form a stack of sheets which have a thickness of 0.1 mm, for example, and which lack rigidity. Assembly rivets have to be insulated, bring about a loss of core cross-section, and do not make it possible to have a stack of sheets which are tightly clamped together over their entire surface. Moreover, the preferred orientation of the grains cannot correspond at all points to the passing of the flux which changes direction. Finally, assembly of these metal sheets is costly and liable to impair their insulating film.

There is known in this connection, according to U.S. Pat. No. 4,223,255, a C-shaped magnetic circuit core constituted by an assembly of strips of sheet metal having high permeability and bent twice. These cores are employed in the stator of a permanent-magnet stepping motor which does not operate by variation of reluctance. Furthermore, the ends of these cores are located in the same plane at rights angles to the axis of rotation and opposite to permanent magnets.

This patent document is therefore no adapted to use in a variable reluctance motor since these motors require teeth within cylindrical airgaps between a stator and a rotor. Moreover, this document does not give any indications in regard to the method of assembly of said strips of sheet metal.

The object of the present invention is to overcome the drawbacks mentioned in the foregoing.

The variable-reluctance dynamoelectric machine which forms the subject of the invention comprises a plurality of structures juxtaposed coaxially with an axis of rotation Z, each structure being constituted by a stator magnetic circuit and a rotor magnetic circuit which are concentric with one another, the stator magnetic circuit being constituted by an assembly of stator angular sectors arranged in a circle about the axis of rotation Z and having, as seen in a direction tangential to the axis of rotation Z, a U-shaped profile having two arms, the entire series of arms of the stator sectors being provided at the free ends of each set of arms with a row of stator teeth located opposite to another row of teeth forming part of the rotor magnetic circuit so as to constitute two rows of airgaps of annular shape, a stator winding 15 of toroidal shape which is concentric with the axis of rotation Z being housed within the U-shaped profiles.

The rotor magnetic circuit can also be constituted by an assembly of a plurality of rotor angular sectors arranged in a circle about the axis of rotation.

An elementary magnetic loop of a structure is constituted by two airgaps of different rows, having substantially the same angular setting and coupled by the stator and rotor sectors, the stator winding being adapted to pass through said loop.

The angular positions of closure of the airgaps of each structure are angularly displaced with respect to those of the other structures.

In the case of a variable-reluctance motor, the stator windings of the different structures are connected sequentially under the control of switching means according to the position of the rotor.

The ampere-turns in the windings produce a flux having a direction transverse to the local direction of motion.

In accordance with the invention, the stator angular sectors and preferably also the rotor sectors are arches each constituted by a stack of strips of magnetic sheet which are bent to different radii about bending axes having a direction which is transverse to the axis of rotation. Furthermore, the stator teeth and preferably the rotor teeth having cylindrical airgap surfaces are constituted by a portion of the sheets. Finally, in said teeth, the teeth extend in planes substantially perpendicular to the axis of rotation.

Preferably, the strips of sheet metal are obtained from a thin magnetic sheet having oriented grains, the orientation of which is transverse to the direction of the bending axes so as to ensure that the orientation of the grains corresponds at all points to the direction of passage of the flux. Moreover, the shortest bending radii are greater than six.

Finally, the invention contemplates the case in which the rotor magnetic circuit accommodates a source of rotor magnetomotive force constituted either by a rotor winding of toroidal shape housed within a channel or by permanent magnets each interposed in a cut-out portion of a rotor arch.

BRIEF DESCRIPTION OF THE DRAWINGS

Other particular features and advantages of the invention will become apparent from the description given hereinafter.

In the accompanying drawings, which are not given in any limiting sense:

FIG. 1 is a partial-cross-section of a motor having three structures A, B and C cut in different axial planes;

FIG. 2 is a partial radial cross-section of the structure B of FIG. 1;

FIG. 3 is a diagram of angular setting of arches;

FIG. 4 is a view in perspective of a ring which has been wound and adhesively bonded from a strip of sheet metal;

FIG. 5 is a view which is similar to FIG. 4 after cutting so as to form a pair of arches;

FIG. 6 is a view which is similar to FIG. 5 with two pairs of airgaps and an individual overmolding;

FIG. 7 is a perspective view of a means for cutting the rings;

FIG. 8 is a view in cross-section and partial perspective of a means for assembling the arches;

FIG. 9 is an axial sectional view of an embodiment with a rotor winding;

FIG. 10 is an axial sectional view of an embodiment with rotor arches each fitted with a permanent magnet;

FIG. 11 is a perspective view of a pole plate;

FIG. 12 is a schematic presentation of groups of structures.

DESCRIPTION OF THE PRESENT EMBODIMENT

The machine shown in partial cross-section in FIG. 1 is constituted by three structures A, B and C juxtaposed coaxially with an axis of rotation Z and each comprising:

a stator magnetic circuit 1 having a U-shaped cross-section, the bending axis of which has a direction X at right angles to the axis Z, the circuit being provided with two arms 2, 3 joined together by the bottom portion 4 of the U. The arms terminate in teeth 5, 6 at a distance Re from the axis Z (see central structure B which is cut at the level of the teeth);

a stator winding having conductors 8 housed inside the U within a channel 7 (see structure C which is cut outside the teeth, the conductors 8 having been omitted);

and a rotor magnetic circuit 21 located in this case internally of the stator magnetic circuit 1 and capable of moving in rotation about the axis Z. This circuit, which also has the shape of a U but is of smaller depth, terminates in teeth 27, 28 which are equal in number to the stator teeth 5, 6 and located opposite to these latter (index b in FIG. 1).

Rotational means 20 such as bearings are provided for supporting a shaft 50.

In FIG. 2, it is apparent that the active conductors 8 constitute a stator winding 15 of toroidal shape, only part of which is illustrated.

It is also apparent that the stator magnetic circuit 1 and the rotor magnetic circuit 21 are each constituted by an assembly of angular sectors, namely stator sectors and rotor sectors respectively.

In accordance with the invention, the stator sectors are stator arches 9 each constituted by a tack of strips of magnetic sheet T which are bent to different radii and fitted inside each other, bending being performed about bending axes, the direction X of which is perpendicular to the axis of rotation Z.

The same applies to the rotor sectors which are rotor arches 22.

In respect of a given angular position, there are thus formed at least two airgaps 5–27 and 6–28 which are directly joined together by two stacks of bent jointless metal sheets with a path which is as short as possible, the two airgaps having preferably the same angular setting. Moreover, each metal sheet is attached progressively, thus enabling its flux to spread within the thickness of the sheet without having to pass into an adjacent sheet.

The portions of the magnetic sheets T which constitute the teeth 5, 6, 27 and 28 are in planes preferably perpendicular to the axis of rotation Z. In other words, the throats of the teeth do not extend to the bottom of the U. This minimizes the permeance of an open airgap.

The airgaps between the teeth are distributed in two rows $5a$–$27a$, $5b$–$27b$, $5c$–$27c$ ... and $6a$–$28a$, $6b$–$28b$, $6c$–$28c$ ... which preferably have the same radius Re.

Only the stator arches 9/1 and 9/2 and rotor arches 22/1 and 22/2 are shown here out of a total of twenty-four arches per magnetic circuit with an angle α equal to 15 degrees between arches. The number Na of arches per magnetic-circuit is sufficiently large to ensure that the broken line of the bottom walls of channels 7 comes close to a circle. As is evident from inspection of the drawings, the stator and rotor angular sectors are independent arches.

The number Nd of teeth of an arch of the same row is equal in this instance to three, designated as a, b and c and forming tooth throats 51. The two airgap rows of one and the same structure close simultaneously.

The lateral faces of the arches are defined by the lateral edges of the metal sheets and are parallel. The throat between two adjacent arch teeth is formed by the space located between the arches so that the tooth pitch should be substantially constant. In order to ensure that said lateral faces of the arches are parallel even at the level of the teeth, the following condition must be satisfied:

$$La = 2 \cdot \pi \cdot Re \cdot (Nd + Rk - 1) / Nd \cdot Na \text{ where}$$

La is the length of an arch parallel to the direction of the bending axis;

Nd is the number of pairs of teeth per arch;

Na is the number of arches of one and the same magnetic circuit;

Re is the airgap radius;

Rk is the cyclic tooth ratio (ratio of a tooth arc to the tooth pitch).

Preferably, Rk is within the range of 0.34 to 0.46 in order to optimize flux variations.

In order to avoid the need to cut-off the corners of the arches located near the axis Z, the following conditions must be satisfied:

$$Ha < Re - La \cdot Na/2 \cdot \pi \text{ where}$$

Ha is the height of said arches.

Machining f the teeth is carried out in this case in a direction parallel to the lateral faces of the arch by forming on each tooth a leading edge 52 which is visible in FIG. 5. This machining operation can also be performed on a magnetic circuit with a small angle so as to ensure that, in the case of each pair of adjacent stator teeth and rotor teeth, airgaps 5–27 and 6–28, the leading edges 52 are inclined to each other at a small angle by introducing a so-called "skewing" effect.

This effect can also be obtained by slightly inclining the direction X of the bending axis of each rotor arch 22 with respect to a plane perpendicular to the axis of rotation Z.

Finally, it is possible to prevent synchronous closure of the airgaps of a given structure, which is the cause of abrupt torque variations and entails the risk of resonance. The angular assembly of the arches in fact makes it possible to have slightly varying angles $\alpha s$ between stator arches or $\alpha r$ between rotor arches. However, in order to avoid simultaneous closure of one airgap and opening of another airgap, the tooth arcs of one magnetic circuit must be longer than the arcs of the other circuit. In other words, the cyclic tooth ratio Rks of the stator must be different from the cyclic tooth ratio Rkr of the rotor. Preferably, Rks>Rkr in order to take leakage fluxes into account. The difference Rks-Rkr sets limits on the variations of $\alpha r$ in order to avoid the simultaneous occurrence of a closed airgap which is beginning to open and another airgap which is completing its closing action. With the example of FIG. 2, with Rks=0.45 and Rkr=0.35, the variations of $\alpha r$ may attain 6.6 ·/ . . . . The variations from one arch to an adjacent arch are preferably random, the sum of variations being clearly zero over one revolution. The diagram of FIG. 3 gives an example of variations of $\alpha r$. It is apparent that an airgap such as b of the arch 9/1 with c of the arch 22/1 has completed its closing action before the airgap c of 9/1 with d of 22/2 begins to open.

It is observed in this example that the length of a tooth in a direction parallel to the axis of rotation Z is only three times greater than the arc of its width, which minimizes edge effects whilst the total length of the leading edges 52 of the teeth of a magnetic circuit, which governs the starting torque, is forty times greater than the axial length of the stator 1.

The stator arches 9 are preferably formed by cutting a ring 29 shown in FIG. 4. The same cutting operation can also produce a rotor arch 22. Said ring 29 is obtained by winding and adhesive bonding such as vacuum impregnation of a strip of the magnetic sheet T which has a constant width, a small thickness, oriented rains and insulated faces. In FIG. 4, this ring is illustrated at the end f the winding operation. Orientation of the grains as a result of rolling is in the direction of the length of the strip, therefore perpendicular to the direction X of the axis of bending and winding of the sheet. The internal opening of the ring preferably has a rectangular shape with rounded corners in order to achieve a gain in winding cross-section without increasing the height. But the smallest bending radius Rc resulting from the winding operation is preferably greater than six times the thickness Et of the metal sheet T in order not to impair the permeability of the sheet.

Generally speaking, the cutting operation is performed in two circumferentially spaced regions. If one starts from arches cut along a plane, this surface can readily become cylindrical by means of a grinding operation performed after assembly of the arches.

Formation of the teeth can be carried out by removal of material by milling or grinding and there is little loss of material.

The cutting operation can also be performed by means of a wire-type spark erosion machining device. The wire 53 of this device remains perpendicular to the direction X of the axis of the ring 29 and is programmed so as to describe a cylindrical tooth profile as shown in FIG. 5, in which only one air of airgaps 5–27/6–28 is shown. Notches 30 permit concentration of the flux in the airgaps. This type of cutting has the advantage of not shortcircuiting the sheets and of being accurate.

Preferably, the cutting program results in the appearance of at least two pairs of airgaps 5a–27a/6a–28a and b–27b/6b–28b as shown in FIG. 6 so as to form tooth throats 51.

As illustrated in FIG. 7, a plurality of rings 29 can be cut simultaneously. In the case f each ring, the ends of a lateral face defined by one edge of the sheet are pressed against an electrode 54 disposed parallel to the wire 53 and having a notch 55 for accommodating the wire at one end of its cutting path so that it does not come into contact with the electrode. It is apparent that cutting of the arches 9/1, 9/2 is completed and that it remains necessary to remove the tooth throats f the arches 22/1, 22/2.

On these arches, it is observed that the preferred orientation of the grains corresponds at each point to the direction of passage of the flux. Core losses are reduced still further by the fact that the flux within the rotor is not reversed, thus reducing the surface area of the hysteresis cycle.

In FIG. 8, there is shown a means for assembling the arches which, in the case of the stator 1, consists of an annular member 32 having a cross-section in the shape of an L which is open towards the airgap and on one lateral face and of a cove 33 which is capable of engaging axially on the annular member while imprisoning the arches 9. To this end, the external curvature of the arch 9 is located substantially on an internal transverse cross-section of the engaged assembly between two webs of material 56. Lugs 34 penetrate into the tooth throats 51 (see FIG. 1, structure C cut between two teeth).

Each arch can be provided in the bottom 4 of the U with a hole 57 through which is passed a fixing means such as a screw with a centering shoulder.

Between the arches, holes 58 extend through the assembled annular members at the level of the webs 56 (see FIG. 2) so that tie-bolts 59 may maintain the annular members of the different structures A, B, C assembled between end-plates 60 in relation with a yoke 10 (see FIG. 1, structure A cut between arches).

Other holes 61 serve to pass the lead-out wires of the windings 15 to one of the end-plates 60.

Another annular member 62 and a cover 63 serve to imprison the rotor arches 22 in the same manner. The rotor annular member 62 has an extension towards the axis Z in the form of a disk 64 which is forcibly fitted on the shaft 50.

The shaft just mentioned has splines 65 which transmit torque and permit compliance with the angular setting between structures. Additional tie-bolts 66 assemble a rotor magnetic circuit 21 (see FIG. 1, structure A).

These assemblies can be made into one-piece units by vacuum impregnation.

Another mode of assembly of the arches of a magnetic circuit consists in overmolding said arches prior to grinding.

It is possible to form only an individual overmolding 67 on the back of an arch as shown in the partial cross-section on the arch 22 of FIG. 6. This overmolding is bonded to the tooth recesses 30, 51 and its external shape lends itself to an annular assembly within a yoke or on a rim.

The structures are thus well isolated magnetically with respect to each other.

In the event that the machine is a variable-reluctance motor, switching means 38 are provided for supplying the stator windings 15 with direct-current pulses, thus constituting a source of stator magnetomotive force (see FIG. 9). These pulses are delivered during the periods of closure by overlapping of the airgaps of the structure considered so as to produce the driving torque. Said periods are indicated by a rotor position signal delivered by a sensor 39. During opening of said airgaps, the other structures of the motor produce the driving torque with a predetermined overlap.

As is apparent from FIG. 9, it is an easy matter to have rotor arches 22 which are also provided with a channel 16 equipped with a rotor winding 35. This winding of toroidal shape can be supplied with direct current via slip rings 36 and brushes 37 which are common to the structures, thus constituting a source of rotor magnetomotive force 68.

As shown in FIG. 10, said source 68 can also be provided by a permanent magnet 69 interposed in a cut-out portion of each rotor arch 2, thus forming two half-arches 22N and 22S, each half-arch being provided with teeth of a single row 27a, 27b . . . or 28a, 28b . . . .

In order to conform t the ratio of the induction of the teeth of a half-arch to the residual induction of the permanent magnet 69, the area of this latter must be at least three times and preferably four or five times larger than that of the teeth. To this end, the half-arches 22N and 22S are each connected to one pole face N, S of the permanent magnet via a pole plate 70N, 70S.

This assembly is held in position between the parts 62 and 63 which are adapted for this purpose and assembled by means of individual tie-bolts 66 for one structure.

A spacer member 71 is place between the pole plates 70 on the side remote from the axis of rotation Z in order to counteract the centrifugal force on the permanent magnet 69.

The cut-out portion can be in a plane at right angles to the axis Z as in FIG. 10.

The dimensions of the permanent magnet are chosen so that the reluctance of this latter may preferably be lower than the reluctance of the airgaps located in the path of its flux and the nature of the permanent magnet is chosen so that the product of its coercive field times its thickness should produce a magnetomotive force which is higher than one-half that of the winding 15.

To this end, it is an advantage to choose a material having a base of rare earths, the powder of which is incorporated with a plastic binder in order to permit more convenient use.

If the permanent magnets of any one structure have the same axial polarity and if the cut-out portions are in the same radial plane, the pole plates of the same polarity 70N, 70S and of the same structure can constitute only a single-piece unit having the shape of a flat ring 72 as shown in FIG. 11.

In the case of a motor equipped with said source 68, the means 38 for switching and 39 for indicating the angular position of the rotor magnetic circuit 21 are designed to supply each stator winding 15 by means of pulses which produce a magnetomotive force having the same direction as that of the rotor magnetomotive force during the driving periods of closure by overlapping of the airgaps. The magnetomotive forces are in this case well distributed on each side of the airgaps while minimizing leakages and reducing copper losses in the case of the permanent magnets.

Moreover, during the periods of opening of the airgaps, the stator magnetomotive force preferably has a direction which is reversed and reduced instead of being suppressed. The teeth which are then partially opposite to each other have a tendency to take up a position in which the opposite fluxes can flow the most freely, that is to say with an open airgap. This accordingly results in a small additional force as well as a higher rate of flux decay.

Finally, if the switching means 38 produce a reversal of the direction of the stator magnetomotive forces with respect to normal driving operation, this results in braking action. Taking into account the rotor magnetomotive source 68, the braking energy can be efficiently recovered, which is particularly advantageous in the case of a vehicle supplied from a storage battery.

The machine described can also be considered as an alternator: with the source of magnetomotive fore 68 and rotor winding 35, an arrangement of means 38 for switching and 39 for indicating the angular position of the rotor magnetic circuit 21 makes it possible to supply the rotor winding 35 with currents of alternate directions in synchronism with the movement of the teeth so as to collect simultaneously on the teeth 5, 6 of the stator arches 9 a flux having a direction which is reversed each time an advance by one tooth pitch takes place. An alternating electromotive force is therefore induced in the stator winding 15. For polyphase operation, provision must be made, however, for a greater number of slip rings and brushes.

it is thus apparent that the same machine is capable of operating according to requirements either as a motor or as an alternator with a view, for example, to charging the storage battery of a vehicle which moves by mean of a heat engine and then to employ electric traction for city travel.

By virtue of the arrangements described, a range of machines can be created with a small amount of complementary tool equipment by varying the number of structures A, B, C . . . per machine, the number of arches Na per structure and the number of teeth Nd per arch while retaining the same type of ring 29.

It is also possible to juxtapose groups of structures such as A, B, C in the case of one group 73 and D, E in the case of another group 74 (see FIG. 12). Each group has a number of teeth Na×Nd which is the same for the different structures of the group and different from that of the other groups. For example, Nd=3 in the case of the first group 71 and Nd=1 in the case of the second group 72 for the same number of arches Na. In consequence, the machine is capable of operating with a speed range which is three times greater and the first group may be disconnected above a predetermined speed if necessary. By means of this arrangement, it is also possible to reduce resonance effects.

As will be readily understood, the positions of the stator arches 9 and rotor arches 22 of FIGS. 1 and 2 can be changed over so as to have a wheel-motor with external rotor as known per se in accordance with FIGS. 1 and 2 of FR-A-2,329,097.

Without departing from the scope of the invention, an arch can be provided with teeth having a slight angular displacement between them about the axis Z so as to make the appearance of the flux progressive, or a displacement equal to one tooth pitch so as to connect, for example, the stator teeth 5a and 6b and the rotor teeth 28b and 27a or even 28b and 27c.

Finally, the airgap radii Re of two rows of airgaps of one and the same structure need not be identical and a row of airgaps can be replaced by a rotary seal reluctance.

I claim:

1. Variable-reluctance rotating dynamoelectric machine comprising a plurality of structures (A, B, C . . . ) juxtaposed coaxially with an axis of rotation (Z), each structure being made up of a stator magnetic circuit (1) and a rotor magnetic circuit (21) which are concentric with each other, the stator magnetic circuit (1) being constituted by an assembly of stator angular sectors arranged in a circle about the axis of rotation (Z) and having, as seen in a direction tangential to the axis of rotation (Z), a U-shaped profile having two arms (2, 3), an entire series of arms of the stator angular sectors being provided at free ends of each set of arms (2, 3) with a row of stator teeth (5a, 5b, 5c . . . /6a, 6b, 6c . . . ) located opposite to another row of teeth (27a, 27b, 27c . . . /28a, 28b, 28c , , , ) forming part of the rotor magnetic circuit (21) so as to constitute two rows of airgaps (5a–27a, 5b–27b . . . /6a–28a, 6b–28b . . . ) of annular shape, a stator winding (15) of toroidal shape which is concentric with the axis of rotation (Z) being housed within U-shaped profiles, wherein the stator angular sectors are independent arches (9) each constituted by a stack of strips of magnetic sheet (T) bent to different radii about bending axes, a direction (X) of which is transverse to the axis of rotation (Z), the stator teeth (5, 6) having cylindrical airgap surfaces constituted by a portion of the sheets (T) and, in the teeth (5, 6), the sheets (T) extend in planes substantially perpendicular to the axis of rotation (Z).

2. Machine according to claim 1, wherein the rotor magnetic circuit (21) is constituted by an annular assembly of angular sectors which are independent rotor arches (22) each formed by a stack of strips of magnetic sheet (T) bent to different radii about bending axes, the direction (X) of which is transverse to the axis of rotation (Z), the rotor teeth (27, 28) having cylindrical airgap surfaces are formed by a portion of the sheets (T) and, in end portions of the rotor teeth (27, 28), the sheets (T) extend in planes substantially perpendicular to the axis of rotation (Z).

3. Machine according to claim 2, wherein a source of rotor magnetomotive force (68) is housed within the rotor magnetic circuit (21).

4. Machine according to claim 3, wherein the source of rotor magnetomotive force (68) is constituted by a rotor winding (35) of toroidal shape housed within a channel (16) of the rotor arches (22).

5. Machine according to claim 3, wherein the source of rotor magnetomotive force (68) is constituted by permanent magnets (69) each interposed within a cut-out portion of one of the rotor arches (22) so as to form two half-arches (22N, 22S) each provided with teeth (27/28) of a single row.

6. Machine according to claim 5, wherein the pole faces (N, S) of the permanent magnets (69) have an area at least three times larger than a total area of the teeth of one half-arch (22N, 22S) and the two half-arches (22N, 22S) are each connected to one pole face (N, S) of the permanent magnet (69) by means of a pole plate (70N, 70S).

7. Machine according to claim 6, wherein the pole plates (70N, 70S) connected to one and the same polarity (N, S) each constitute only a single part having the shape of a flat ring (72).

8. Machine according to claim 2, wherein in each of said structures, a length (La) of an arch in the direction (X) of the bending axis of said arch is constant and a height Ha of the arches of the magnetic circuit located nearest the axis of rotation (Z), the number (Na) of arches constituting said magnetic circuit, an airgap radius (Re) satisfying substantially the condition:

$$Ha < Re - La \cdot Na/2 \cdot \pi.$$

9. Machine according to claim 1, wherein the strips of magnetic sheet are obtained from a thin magnetic sheet having oriented grains an orientation of which is transverse to the direction (X) of the bending axes.

10. Machine according to claim 9, wherein the shortest bending radii (Rc) are greater than six times a thickness (Et) of the magnetic sheet (T).

11. Machine according to claim 1, wherein each arch arm (9; 22) has at least two teeth (5a, 5b–6a, 6b/27a, 27b–28a, 28b) which follow one another circumferentially and are separated by a tooth throat (51).

12. Machine according to claim 11, wherein the length (La) of an arch in the direction (X) of the bending axis of said arch is constant and the number (Nd) of pairs of teeth per arch, the number (Na) of arches constituting a magnetic circuit, the length (La) of an arch, the airgap radius (Re) and the cyclic tooth ratio (Rk) satisfy substantially the conditions:

$$La = 2 \cdot \pi \cdot Re \cdot (Nd + Rk - 1)/Nd \cdot Na, \text{ wherein}$$

$$0.34 < Rk < 0.46.$$

13. Machine according to claim 1, wherein the cyclic tooth ratio Rks of the stator magnetic circuit (1) is greater than a cyclic tooth ratio Rkr of the rotor magnetic circuit (21) (Rks>Rkr) and angles (αr) between adjacent arches of the magnetic circuit (21) which have a lowest cyclic tooth ratio (Rkr) vary within limits such as to avoid a simultaneous occurrence of a closed airgap which is beginning to open and of another airgap which is beginning to close.

14. Machine according to claim 1, wherein a leading edge (52) is provided on each tooth, the leading edges (52) of each pair of adjacent stator and rotor teeth (5–27, 6–28) being inclined relative to each other at a small angle.

15. Machine according to claim 1, wherein each rotor arch (22) has a direction of bending axis (X) which is slightly inclined with respect to a plane perpendicular to the axis of rotation (Z).

16. Machine according to claim 1, further comprising groups (73, 74) of juxtaposed structures (A, B, C . . . ), each group being provided with a same number of teeth (Nd×Na) per structure and one group being provided with a number of teeth (Nd×Na) which is different from that of the other groups.

17. Machine according to claim 1, wherein each arch is provided in a bottom (4) of the U-shaped profile with a hole (57) through which a fixing means is passed.

18. Machine according to claim 1, wherein that portion of an arch which is remote from the teeth (5, 6; 27, 28) constitutes the back of an arch, an arch (9, 22) being provided on its back with an individual overmolding (67) bonded to the tooth throats (30, 51), an external shape of which lends itself to an annular assembly.

19. Variable-reluctance rotating dynamoelectric machine comprising a plurality of structures (A, B, C . . . ) juxtaposed coaxially with an axis of rotation (Z), each structure being made up of a stator magnetic circuit (1) and a rotor magnetic circuit (21) which are concentric with each other, the stator magnetic circuit (1) being constituted by an assembly of stator angular sectors arranged in a circle about the axis of rotation (Z) and having, as seen in a direction tangential to the axis of rotation (Z), a U-shaped profile having two arms (2, 3), an entire series of arms of the stator angular sectors being provided at free ends of each set of arms (2, 3) with a row of stator teeth (5a, 5b, 5c . . . /6a, 6b, 6c . . .) located opposite to another row of teeth (27a, 27b, 27c . . . /28a, 28b, 28c , , ,) forming part of the rotor magnetic circuit (21) so as to constitute two rows of airgaps (5a–27a, 5b–27b . . . /6a–28a, 6b–28b . . .) of annular shape, a stator winding (15) of toroidal shape which is concentric with the axis of rotation (Z) being housed within U-shaped profiles, wherein the stator angular sectors are independent arches (9) each constituted by a stack of strips of magnetic sheet (T) bent to different radii about bending axes, a direction (X) of which is transverse to the axis of rotation (Z), the stator teeth (5, 6) having cylindrical airgap surfaces constituted by a portion of the sheets (T) and, in the teeth (5, 6), the sheets (T) extend in planes substantially perpendicular to the axis of rotation (Z), and wherein said independent arches of said stator angular sectors and independent arches of angular sectors of said rotor magnetic circuit are formed by a ring (29) formed by a process of winding and adhesively bonding a strip of magnetic sheet (T) of constant width, and of cutting the ring (29) into two regions in circumferentially spaced relation so as to obtain two arches (9; 9,22).

20. Machine according to claim 19, wherein said ring (29) cutting step is carried out by means of a spark erosion device of a type comprising a wire (53) which is programmed so as to follow a tooth profile while remaining substantially perpendicular to the direction (X) of the bending axis of the ring (29).

21. Machine according to claim 20, wherein said cutting step is carried out simultaneously on a plurality of rings (29), of which one face defined by one edge of the magnetic sheet (T) is pressed against an electrode (54) disposed parallel to the wire (52) and having a notch (55) in which the wire is located at one of its cutting ends.

* * * * *